3,505,298
SYNTHETIC COPOLYAMIDES CONTAINING
PENDANT FLUORENE GROUPS
Anthony Charles Davis, Newport, and Ronald Austin
Thompson, Caerleon, England, assignors to Imperial
Chemical Industries Limited, London, England, a corporation of Great Britain
No Drawing. Filed July 13, 1967, Ser. No. 653,048
Claims priority, application Great Britain, Aug. 1, 1966,
34,389/66
Int. Cl. C08g 20/00
U.S. Cl. 260—78                                2 Claims

ABSTRACT OF THE DISCLOSURE

Polyamides with pendant ring sidechains, e.g., 9,9-fluorene suitable for melt spinning into filaments.

---

This invention relates to the manufacture of synthetic linear polymers and more particularly to synthetic linear copolyamides containing pendant rings on the chain.

High molecular weight synthetic linear polyamides, by which is meant polyamides of sufficiently high molecular weight to be capable of being melt-spun, have long been known and some are manufactured on a large scale for melt-spinning into filaments by the polycondensation of low molecular weight diamines and dicarboxylic acids or of aminocarboxylic acids, for example, polyhexamethylene adipamide may be made by the condensation of hexamethylene diamine and adipic acid. A similar polyamide is obtainable by the polycondensation of omega-aminocaproic acid. In place of the latter the corresponding lactam, namely epsilon-caprolactam can be polymerized so as to afford a polyamide.

Such polyamides are melt-spun into filaments and then submitted to a drawing operation in the solid state which introduces orientation into the polyamide molecules constituting the filaments and develops a high tenacity and other desirable textile properties.

It has now been found that copolyamides made by introducing into a linear polyamide chain a small proportion of pendant groups containing at least 1 ring, e.g. a 9,9-fluorene residue, or phenyl, important advantages are gained. The resulting copolyamides on melt-spinning afford filaments which are found to be more extensible on drawing in the solid state than the homopolyamides. In this way it is possible to melt-spin a thicker filament and draw it to the required denier and extensibility so that the output of the melt-spinner is raised, as will appear from the numerical examples quoted below.

The present copolyamides are also distinguished by possessing a very good tenacity.

Accordingly the invention relates to a process for the manufacture of novel synthetic linear copolyamides by heating a monomer consisting of an approximately equimolecular mixture of an aliphatic alpha, omega-diamine having from four to twenty carbon atoms and an aliphatic alpha, omega-dicarboxylic acid having from six to twenty-two carbon atoms, in which monomer the amino and carboxy groups may be replaced by polyamide-forming functional derivatives thereof, wherein ½–10 molar percent of the aforesaid monomeric diamine or dicarboxylic acid or functional derivative thereof is replaced by an equivalent molar quantity of a diamine or dicarboxylic acid respectively falling within the above classes thereof except that it carries a monovalent or divalent group comprising at least one alicyclic, heterocyclic or aromatic ring, devoid of other than aromatic unsaturation.

Examples of the aliphatic diamines are:

Hexamethylene diamine
3-methylhexamethylene diamine
Tetramethylene diamine
Decamethylene diamine
Octamethylene diamine
1,6-diamino-6-methylheptane Examples of the aliphatic dicarboxylic acids are:

Adipic acid
Beta-methyladipic acid
Sebacic acid
Suberic acid
Pimelic acid
Hexadecamethylene dicarboxylic acid Examples of the aminocarboxylic acids are: epsilon-aminocaproic acid, omega-aminoundecanoic acid and omega-aminoheptanoic acid.

Examples of the polyamide-forming functional derivatives include N-formyl derivatives of the diamines, ethyl and other esters of the dicarboxylic acids. Particularly advantageous are, however, salts derived from the diamines and dicarboxylic acids, e.g. hexamethylene diammonium adipate.

Monomeric components containing a monovalent or divalent group comprising at least one alicyclic, heterocyclic or aromatic ring in accordance with the invention are, for instance:

Dicarboxylic acids 1-phenyladipic acid
2-phenyladipic acid
2,3-diphenyladipic acid
1,1-diphenyladipic acid
2,3-dicyclohexyladipic acid
1,2-diphenyladipic acid
1,4-diphenyladipic acid
1-benzyladipic acid
1,4-dibenzyladipic acid
1,4-di-m-tolyladipic acid
1,4-di-p-tolyladipic acid
1,4-di-cyclohexyladipic acid
1-phenylpimelic acid
5,5-bis(beta-carboxyethyl)-2-oxo-tetramethylene-imine
1,5-diphenylpimelic acid
1,1-diphenylpimelic acid
1,5-dibenzylpimelic acid
1,5-dicyclohexylpimelic acid
1-(beta-phenylethyl)pimelic acid
2-phenylsuberic acid
3-benzylazelaic acid
1,1-diphenylazelaic acid
9,9-fluorene-diproprionic acid
1,1-diphenylsebacic acid
9,9-fluorene-dibutyric acid Diamines N-benzylhexamethylene diamine
N,N'-dibenzylhexamethylene diamine
1-phenylhexamethylene diamine
2-phenylhexamethylene diamine
1,6-diphenylhexamethylene diamine
1,8-diphenyloctamethylene diamine
9,9-di(2'-aminoethyl)-fluorene
9,9-di(3'-aminopropyl)-fluorene
9,9-di(4'-aminobutyl)-fluorene Functional derivatives of acids or amines Hexamethylenediammonium 1,4-diphenyl adipate
2-phenylhexamethylene diammonium adipate
Ethyl 2-phenylsuberate
N,N'-dibenzylhexamethylenediammonium adipate
Hexamethylenediammonium 9,9-fluorene-dipropionate The introduction of monomeric diamine, dicarboxylic acid or aminocarboxylic acid bearing the monovalent groups with a ring, may be at the commencement of or during the polymerization; the proportion employed is preferably from ½ to 5 molar percent.

Amongst the reagents employed in making the copolyamides mono- and di-functional compounds, notably amines and acids e.g. acetic acid may be employed as viscosity stabilisers. Other adjuvants may also be incorporated in the polyamides at any convenient stage of their manufacture, for instance: dyestuffs, pigments, dyestuff-formers, plasticisers, delustrants, resins.

The invention includes the above novel copolyamides and the melt-spinning thereof into filaments.

In the following examples which are intended to illustrate, not limit the invention, the parts are parts by weight.

EXAMPLE 1

51.88 parts of hexamethylenediammonium adipate, 1.06 part of hexamethylenediammonium 1,4-diphenyl-adipate and 0.06 part of acetic acid are heated together in a nitrogen filled sealed tube for 3 hours, at 220° C., followed by heating at 285° C. for 1½ hours at atmospheric pressure under a slow stream of nitrogen. The resulting copolymer is spun at 285° C. to give a 120 denier yarn of 5 filaments, which is drawn to 6 times its length over a hot plate at 100° C.

The resulting yarn has a tenacity of 7.13 g./d. and an extensibility of 18%. When drawn to 5.5 times its original length this yarn has a tenacity of 6.53 g./d. and an extensibility of 21%.

Polyhexamethylene adipamide yarn made in the same way can only be drawn under the above conditions to five times its original length and then has a tenacity of 6.22 gm./den. and an extensibility of 22%.

EXAMPLE 2

113.6 parts of hexamethylenediammonium adipate, 0.52 part of hexamethylenediamine, 1.35 parts of 9,9-fluoroene-dipropionic acid, 0.13 part of acetic acid and 75 parts of water are heated with stirring in an autoclave under nitrogen, until the pressure reaches 250 lbs./sq. in. and the temperature 210° C. Heating is continued and the pressure kept at 250 lbs./sq. in. until the temperature reaches 245° C. The pressure is then reduced steadily over a period of 1 hr. to atmospheric pressure, the temperature rising to 265° C. The temperature is increased to 275° C. and after 20 minutes the copolymer is extruded as ribbon and cooled.

The copolymer is melt-spun at 290° C. at 1198 metres/minute to give a 90 denier yarn of 10 filaments, which is drawn to 2.74, 2.99 and 3.26 times its original length over a cold snubber pin. Polyhexamethyleneadipamide yarn is prepared in the same way for comparison. The properties of the yarns are given below.

| Draw ratio | Polyhexamethyleneadipamide | | Copolymer of Example 2 | |
|---|---|---|---|---|
| | Tenacity, g./d. | Extensibility, percent | Tenacity, g./d. | Extensibility, Percent |
| 2.74 | 4.7 | 35 | 4.2 | 44 |
| 2.99 | 5.5 | 25 | 4.8 | 33 |
| 3.26 | 6.4 | 20 | 5.7 | 22 |

EXAMPLE 3

51.1 parts of hexamethylenediammonium adipate, 2.14 parts of hexamethylenediammonium 9,9-fluorenedipropionate, and 0.06 part of acetic acid are heated together in a sealed vessel under nitrogen for 3 hours at 220° C. and then at 285° C. for 1½ hours at atmospheric pressure under a slow stream of nitrogen. The resultant copolymer is spun at 285° C. to give a 120 denier yarn of 5 filaments which is drawn to 5.5 times its original length over a hot plate at 100° C.

The resulting yarn has a tenacity of 6.81 g./d. and an extensibility of 22%.

EXAMPLE 4

52.0 parts of hexamethylenediammonium adipate, 0.49 part of N,N'-dibenzylhexamethylenediammonium adipate, and 0.06 part of acetic acid heated together as in Example 1. The copolymer so obtained is spun at 285° C. to give a 120 denier yarn which is drawn to 6 times its length over a hot plate at 180° C.

The resulting yarn has a tenacity of 8.7 g./d. and an extensibility of 11.5%. When drawn to 5.5 times its original length this yarn has a tenacity of 7.8 g./d. and an extensibility of 13.6%.

Polyhexamethylene adipamide when made in the same way can only be drawn under the above conditions to 5 times its original length and has a tenacity of 6.45 g./d. and an extensibility of 12.4%.

EXAMPLE 5

53.08 parts of hexamethylenediammonium adipate, 0.671 part of 9,9-di(3'-aminopropyl)-fluorene, 0.35 part of adipic acid and 0.06 part of acetic acid are heated together as in Example 1. The resulting copolymer is spun at 285° C. to give a 120 denier yarn of 5 filaments which is drawn to 5.5 times its length over a hot plate at 180° C. The yarn has a tenacity of 8.1 g./d. and an extensibility of 12.0%.

EXAMPLE 6

A solution of 100 parts of hexamethylenediammonium adipate, 3.93 parts of hexamethylenediammonium 9,9-fluorenedipropionate, 1.5 parts of hexamethylenediamine and 0.69 part of acetic acid dissolved in 172.5 parts of water, is pumped at a rate of 2060 cc./hr. and under a pressure of 22 atmospheres into a narrow coiled steel tube comprising 30 metres of internal diameter 3.2 mm. followed by 12.8 metres of internal diameter 9.45 mm. maintained at 290° C.

The resulting polymer is melt-spun through a 10-hole spinneret and wound up at 1198 metres/minute to give a 90 denier yarn which is drawn to 2.74, 2.99, 3.26 and 3.55 times its original length over a cold snubber pin.

Polyhexamethyleneadipamide yarn is prepared in the same way for comparison. The properties of the yarns are given below:

| Draw ratio | Polyhexamethyleneadipamide | | Copolymer of Example 6 | |
|---|---|---|---|---|
| | Tenacity, g./d. | Extensibility, percent | Tenacity, g./d. | Extensibility, percent |
| 2.74 | 3.4 | 39 | 3.5 | 60 |
| 2.99 | 3.9 | 28 | 3.7 | 43 |
| 3.26 | 4.5 | 25 | 3.9 | 28 |
| 3.55 | 5.5 | 14 | 4.5 | 21 |

What we claim is:

1. Solid linear copolyamides of a substantially equimolecular mixture of aliphatic alpha, omega-diamine having from 4 to 20 carbon atoms and an aliphatic, alpha, omega-dicarboxylic acid having from 6 to 12 carbon atoms or polyamide-forming functional derivatives thereof and from ½ to 10 molar percent of a substantially equi-molecular mixture of aliphatic, alpha, omega-diamine having from 4 to 20 carbon atoms and an aliphatic, alpha, omega-dicarboxylic acid having from 6 to 12 carbon atoms or polyamide-forming functional derivatives thereof in which the said diamine or dicarboxylic acid carries a fluorene ring attached to nitrogen or carbon atoms of said diamine or dicarboxylic acid at the 9-position of the fluorene.

2. A polyamide as set forth in claim 1 in which the molar percentage of said substantially equi-molar mixture is ½ to 5.

(References on following page)

References Cited

UNITED STATES PATENTS

| | | | |
|---|---|---|---|
| 2,631,992 | 3/1953 | Speck | 260—78 |
| 2,865,894 | 12/1958 | Greenberg et al. | 260—78 |
| 2,880,196 | 3/1959 | Frank et al. | 260—78 |
| 2,931,789 | 4/1960 | Wielicki | 260—78 |
| 3,143,530 | 8/1964 | D'Onofrio | 260—78 |
| 3,226,362 | 12/1965 | Jackson et al. | 260—78 |
| 3,287,321 | 11/1966 | Temin | 260—78 |
| 3,296,201 | 1/1967 | Stephens | 260—78 |
| 3,297,656 | 1/1967 | Caldwell | 260—78 |

HAROLD D. ANDERSON, Primary Examiner

U.S. Cl. X.R.

57—140